United States Patent
Gill et al.

(10) Patent No.: US 9,145,908 B2
(45) Date of Patent: Sep. 29, 2015

(54) BLIND FASTENER

(75) Inventors: Neil Frank Gill, Shipley (GB); Mark Gaskell, Bradford (GB); Douglas Ramsey Norris, Heckmondwike (GB); Terry Williams, Leeds (GB)

(73) Assignee: EV IP LP, Dover, DE (US)

( * ) Notice: Subject to any disclaimer, the term of this patent is extended or adjusted under 35 U.S.C. 154(b) by 640 days.

(21) Appl. No.: 13/328,738

(22) Filed: Dec. 16, 2011

(65) Prior Publication Data

US 2013/0156525 A1  Jun. 20, 2013

(51) Int. Cl.
| | |
|---|---|
| F16B 13/04 | (2006.01) |
| F16B 13/06 | (2006.01) |
| F16B 13/08 | (2006.01) |
| F16B 35/02 | (2006.01) |
| F16B 3/00 | (2006.01) |
| F16B 33/00 | (2006.01) |

(52) U.S. Cl.
CPC ............ F16B 13/066 (2013.01); F16B 13/0858 (2013.01); F16B 35/02 (2013.01); F16B 3/00 (2013.01); F16B 33/002 (2013.01)

(58) Field of Classification Search
CPC .... F16B 13/065; F16B 13/061; F16B 13/066; F16B 13/063; F16B 13/124; F16B 13/0858; F16B 3/00; F16B 33/002; F16B 35/02
USPC .......................................................... 411/32
See application file for complete search history.

(56) References Cited

U.S. PATENT DOCUMENTS

| | | | | |
|---|---|---|---|---|
| 4,194,858 | A | * | 3/1980 | Evans ........................ 405/259.3 |
| 4,293,259 | A | * | 10/1981 | Liebig ............................. 411/32 |
| 2005/0210771 | A1 | | 9/2005 | Kuenzel |
| 2007/0286702 | A1 | * | 12/2007 | Smith ............................ 411/432 |

FOREIGN PATENT DOCUMENTS

| | | |
|---|---|---|
| AU | 199963200 B2 | 6/2000 |
| DE | 102005026942 A1 | 12/2006 |
| EP | 0175273 A1 | 9/1984 |
| EP | 1 880 800 A1 | 1/2008 |
| GB | 2477361 A | 8/2011 |
| WO | WO 00/19113 | 4/2000 |
| WO | WO 2011/138306 A1 | 11/2011 |

OTHER PUBLICATIONS

UK Intellectual Property Office, Search Report Under Section 17(5) for Application No. GB1009933.1, Oct. 14, 2011.

\* cited by examiner

*Primary Examiner* — Roberta Delisle
(74) *Attorney, Agent, or Firm* — Cantor Colburn LLP (57) ABSTRACT

A blind fastener adapter for a conventional screw-threaded nut and screw comprises a collar and a segmented ring over the collar, the ring and collar having a tapered interface wherein relative axial movement results in a change of diameter of the ring. The adapter further includes a spring adapted to bias the collar and ring into mutual engagement; the collar and ring include means to prevent substantial relative angular movement thereof. The collar is adapted for engagement by a blind side head of the screw in use, and the ring is adapted for blind side engagement of the perimeter of a hole.

14 Claims, 10 Drawing Sheets

BLIND FASTENER

FIELD OF THE DISCLOSURE

This disclosure relates to a blind fastener and particularly to a blind fastener adapter for a conventional screw-threaded nut and screw.

BACKGROUND OF THE DISCLOSURE

Blind fasteners are well known, and comprise devices insertable from one side through a hole in a member, and having means to anchor the device on the distal side of the hole. A screw-threaded component may be included, to tighten the device to the member. Such fasteners are utilised where access is available from one side only, and may for example clamp members together or be used to provide an anchorage. Typically a blind fastener includes a proximal side screw-threaded component having a screw-threaded distal (or blind) side anchorage arranged for close fitting passage through a hole. Once through the hole, the distal side anchorage changes form so as to resist withdrawal thereof, whereupon the proximal side component is tightened to firmly attach the fastener. The distal side fastener may for example comprise a folding component which is adapted to pass through the hole in folded form, and open out on the distal side to a diameter larger than the hole.

BRIEF SUMMARY

According to the disclosure, there is provided a blind fastener adapter for a conventional screw-threaded nut and screw, the adapter comprising a collar and a segmented ring over the collar, the ring and collar having a tapered interface wherein relative axial movement results in a change of diameter of the ring, the adapter further including a spring adapted to bias the collar and ring into mutual engagement, the collar and ring including means to prevent substantial relative angular movement thereof, the collar being for engagement by a blind side head of the screw in use, and the ring being adapted for blind side engagement of the perimeter of a hole.

The blind side head may be a nut or the head of a male fastener, such as a machine screw or bolt. The screw may be a threaded stud, or the shank of a male fastener.

In an embodiment, the ring and collar are fixed against relative rotation by dogs; such dogs may for example comprise protrusions of one of the ring and collar, and mating recesses of the other of the ring and collar. In one embodiment protruding rails of the collar extend in the direction of the axis of rotation thereof, and engage in close fitting grooves of the ring.

The ring may have three segments, each segment being restrained by a suitable dog. Each segment may be retained against radial separation from the collar, for example by an enlarged head of a rail engageable in an undercut groove. Each segment may comprise an individually separable component retained solely by a suitable form-locking profile.

In an embodiment, the spring is a coil compression spring bearing directly on the ring in use, and sized to fit closely around the screw.

The fastener may include a further coil compression spring outboard the aforesaid coil compression spring and of a diameter insufficient to pass through a hole for which the fastener is intended. Such a further spring provides frictional bias to provide anti-rotational force for the collar, in use.

The adapter may further include a collared washer at the proximal side of the coil spring, the reduced diameter of the washer being sized to engage closely within the hole for which the fastener is intended, and the washer having an internal recess of sufficient depth to accept the spring when compressed. Such a recess avoids potential coil binding of the spring, which could affect proper tightening of the fastener.

In another embodiment, the ring has a reduced diameter portion at the proximal side so as to present a shoulder. The reduced diameter portion is also sized for close fitting engagement in the hole for which the fastener is intended, and the shoulder bears on the perimeter of the distal side of the hole in use.

A further washer may be provided proximally of the segmented ring so as to distribute spring loads applied thereto. Preferably the further washer is a close diameter fit in the hole for which the fastener is intended, and preferably is of a thickness to substantially bridge the clearance between the segmented ring and collared washer in use. Such a close fitting washer provides additional support against lateral forces acting on the fastener in use.

A blind fastener adapter according to the disclosure has the advantage of being retro-fittable to a standard machine screw, for example a bolt. This means that special threaded components are not required, and that standard specification threads with known material properties can be used. Standard machine screws are relatively inexpensive compared with special forms. Furthermore, standard fixing tools, such as socket spanners, may be used for both standard and blind fasteners. Moreover, a special supply of blind fasteners is unnecessary provided that a supply of suitable adapters is provided for those instances where a blind fastener is required.

BRIEF DESCRIPTION OF THE DRAWINGS

Other features will be apparent from the following description of an embodiment shown by way of example only in the accompanying drawings, in which:

FIGS. 4A-4E illustrates in axial section the steps of installation of a blind fastener embodying the disclosure;

FIGS. 5A-5E correspond to FIGS. 4A-4E, respectively, and show the fastener in full side elevation;

FIGS. 14A-14F show a perspective view of a plurality of fastener adapters having differing shouldered washer configurations;

FIGS. 15A-15F each show a cross-sectional view of the fastener adapters of FIGS. 14A-14F, respectively;

DETAILED DESCRIPTION

Figure 1:
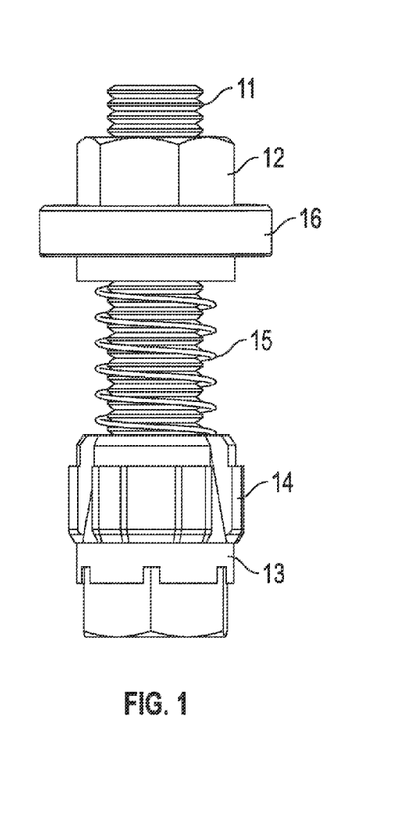
FIGS. 1 and 2 illustrate in elevation two variants of a fastener adapter according to the disclosure, in combination with a machine screw and nut.
Figure 2:
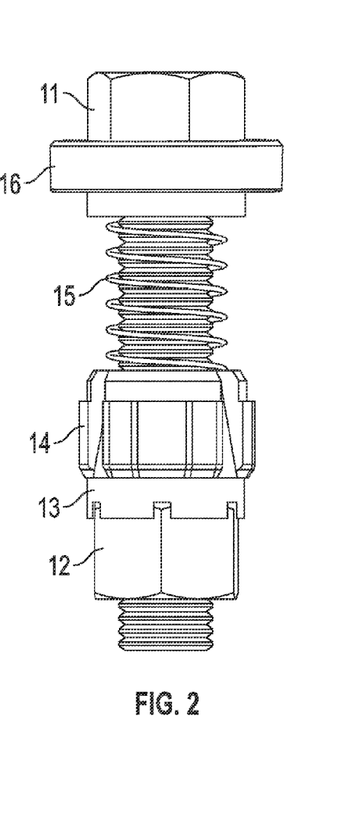
Figure 3:
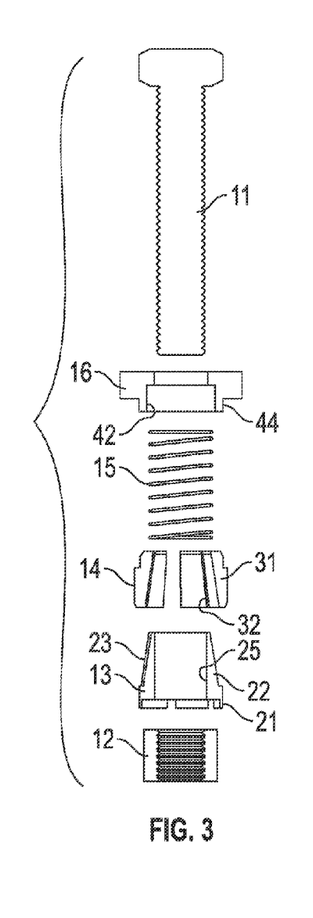
FIG. 3 illustrates an exploded fastener adapter according to an embodiment of the disclosure in cross section, in combination with a machine screw and nut.

With reference to FIGS. 1 to 3, a fastener comprises a conventional hexagonal headed machine screw 11 having a corresponding hexagon nut 12 of the same size. Between the head of the machine screw and the nut the components of an adapter comprise in series, a tapered collar 13, a segmented ring 14, a coil compression spring 15 and a shouldered washer 16. The adapter renders the standard screw and nut suitable for blind (one-sided) installation, and may be filled to the machine screw and nut in either orientation, as illustrated in FIGS. 1 and 2, with the proviso that in use the fastener enters a corresponding hole collar first.

Figure 6:
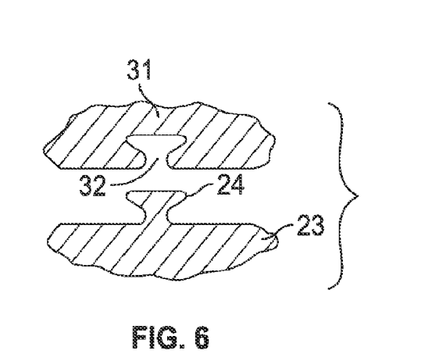
FIG. 6 illustrates a suitable form locking arrangement between collar and ring.

The collar 13 comprises a plain diameter portion 21 for contact with the adjacent hexagon and a tapered portion 22 having three equi-spaced protruding rails 23. Each rail has an enlarged head 24 (FIG. 6) of constant section. The rails 23 extend in the direction of the axis of the fastener, and the bore 25 of the collar allows free movement along the threads of the fastener.

The ring comprises three identical and equi-spaced segments 31 each having an undercut recess 32 (FIG. 6) for sliding engagement with the respective enlarged head 24. The internal surfaces of the segments 31 are arcuate and conical in form, so as to match the conical form of the collar 13. The proximal side of the segments is shouldered so that in use ring 14 fits closely in the distal side of a hole for which the fastener is intended.

The spring 15 is a light wire coil compression spring, which in use biases the segments of the ring 14 towards the collar 13 (downwardly as viewed in FIG. 3).

The shouldered washer 16 has a smaller diameter 41 adapted for close fitting engagement in the proximal side of a hole for which the fastener is intended. The internal diameter 42 is also relieved to accommodate the proximal end of the spring 15, and is of sufficient depth to accept the spring without coil binding. In other words the spring can be fully compressed and housed within the washer 16, for reasons which will become apparent.

In order to convert a standard fastener to blind use, the components of the assembly are assembled in the manner indicated in FIG. 1 or FIG. 2—the coil spring 15 lightly biases the ring 14 and collar 13 into engagement, and the ring 14 tends to adopt a position at the base of the taper of the collar 13, as illustrated in FIGS. 1 and 2. In this condition, the outside diameter of the ring is greater than the plain portion 21 of the collar.

Figure 4A:
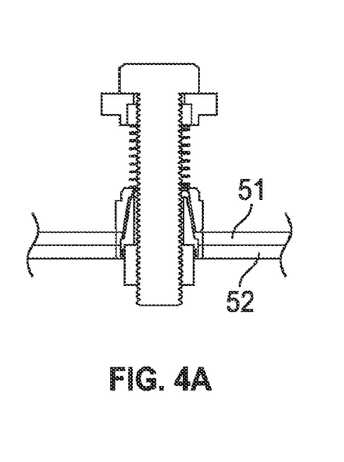
Figure 4B:
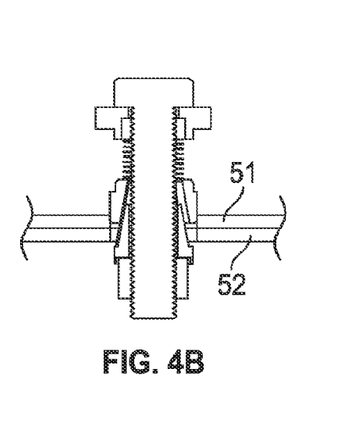

With reference to FIGS. 4A-4E and 5A-5E, the blind fastener assembly is offered up to a hole, collar first. In the illustrated case a through hole of two plates 51, 52 is provided. The dimensions of the adapter and hexagons are selected so that the distal hexagon and collar 13 pass freely through the hole, but the ring 14 does not (FIG. 4A). Further light insertion pressure causes the spring 15 to collapse (FIG. 4B) as the collar and ring separate the segments 31 move radially inwardly in consequence of the form-locking profile of FIG. 6.

Figure 4C:
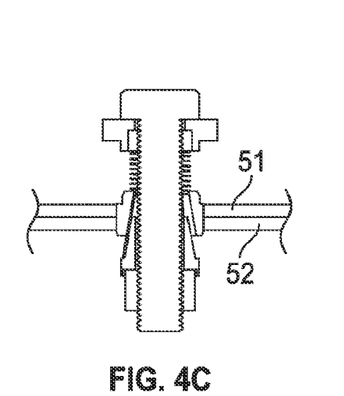
Figure 4D:
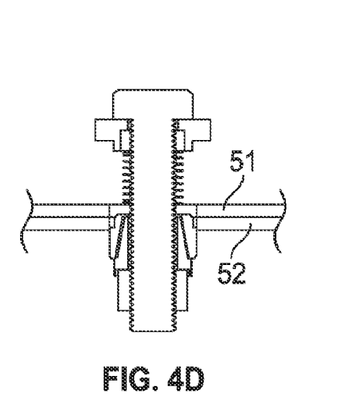
Figure 4E:
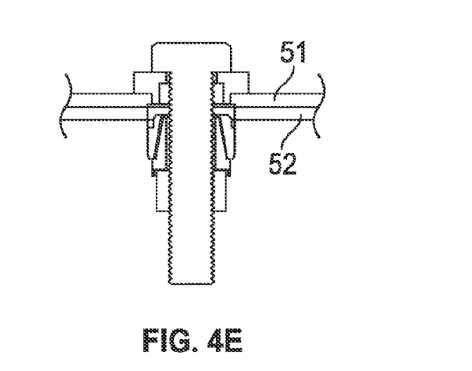
Figure 5A:
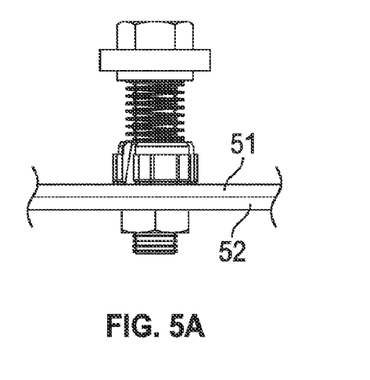
Figure 5B:
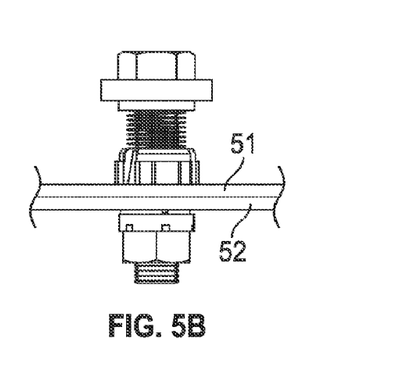
Figure 5C:
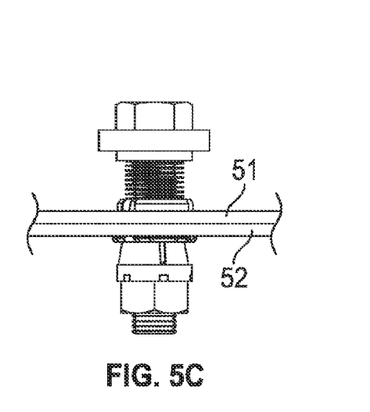
Figure 5D:
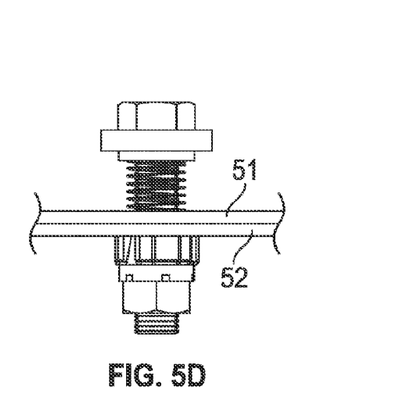
Figure 5E:
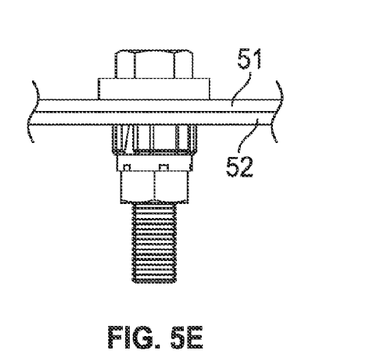

The taper is arranged so that the segments are drawn sufficiently inwardly to eventually pass through the hole (FIG. 4C) under pressure from the spring 15, whereupon the collar and ring become more closely engaged again, which in turn guides the segments to a radially outer condition in which the shouldered portion of the ring engages in the distal side of the hole (FIG. 4D).

The proximal side hexagon may now be turned to tighten the fastener by hand, a slight proximal pull being sufficient to ensure frictional drag on the distal side hexagon. The drag force may be enhanced by suitable raised formations of the areas in contact, or alternatively the collar may be arranged to lightly grip the adjacent hexagon.

Final tightening is by spanner or torque wrench, the spring being fully housed within the shouldered washer so as not to impede engagement of the ring 14 and distal side plate 52.

The hexagons are selected so as to pass through the hole, though it will be understood that this is not a functional requirement for the distal side hexagon. Furthermore, hexagon heads are not essential, and could be replaced by equivalent means such as screwdriver slots or cap heads incorporating a recessed fastener drive form. Use of the blind fastener is generally intuitive, and accordingly incorrect installation is unlikely.

In the illustrated embodiment, the fastener is used to clamp two plates together. However the fastener is also suitable for forming a load bearing attachment in any planar surface of which access to the distal side is restricted. In particular, fasteners embodying the disclosure may be used to provide fixings to hollow sections.

Figure 7:
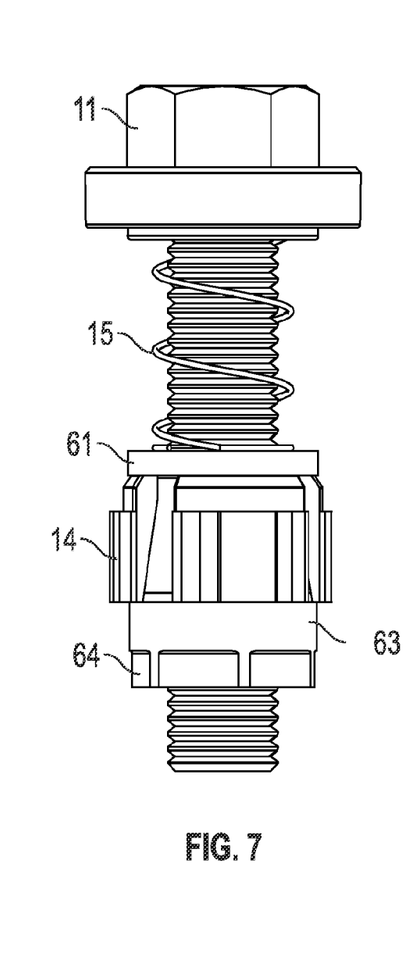
FIG. 7 illustrates an alternative embodiment having a load spreading washer.

FIG. 7 shows a variation of the embodiment of FIGS. 1 to 6, in which the washer 61 is provided on the proximal side of the ring 14, and against which the light spring 15 acts. The washer 61 is selected to be of smaller diameter than the hole for which the fastener is intended, and is preferably a close fit for reasons which will become apparent. The washer 61 may include a circular recess (not shown) on the proximal side to better locate the spring so as to avoid contact with the screw threads.

Figure 8:
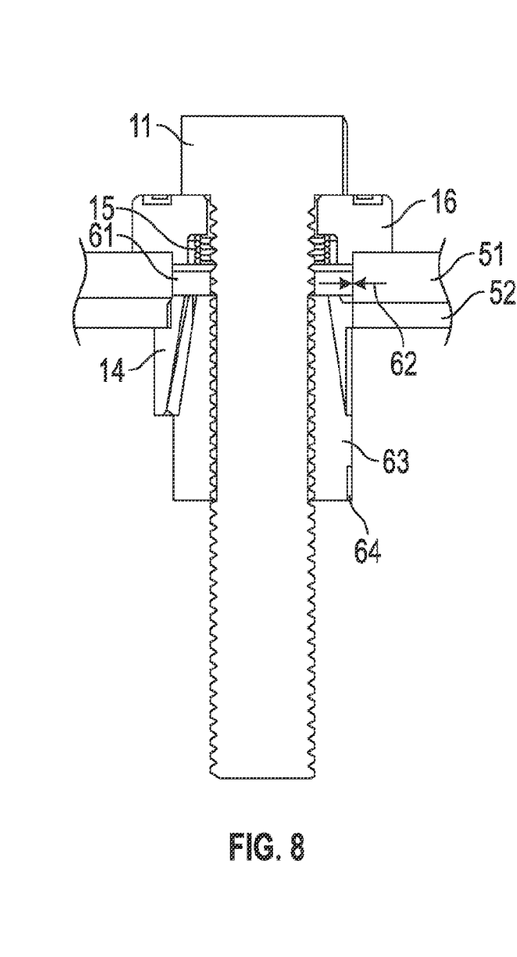
FIG. 8 shows the embodiment of FIG. 7 in axial section, and in the assembled condition.

The washer 61 ensures synchronised movement of the segments and, as illustrated in FIG. 8, provides additional support against lateral shearing and bearing forces which tend to tip the fastener in the hole, and are illustrated by arrows 62. The thickness of the additional washer 61 is in practice selected to suit the thickness of the hole for which the fastener is intended, taking into account an allowance for the spigot diameter of the standard shouldered washer 16 and the collar 14. FIG. 8 clearly shows how the light spring 15 is housed in a recess of the washer 16 when the components are in the assembled condition.

FIGS. 7 and 8 also illustrate that it is possible to combine the nut 12 and collar 13 into a single component comprising a threaded cone 63. External flats 64 or like features may be provided on the cone blank to facilitate holding during thread tapping.

Figure 9:
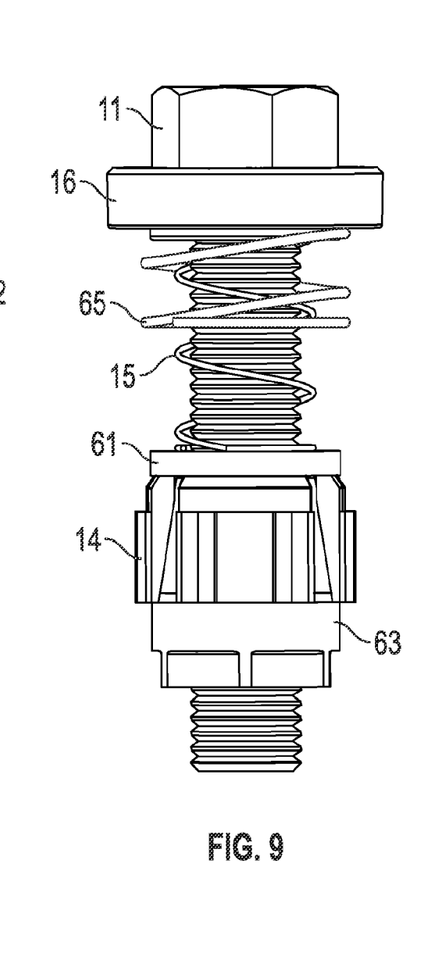
FIG. 9 is a further alternative having a fitting spring.

FIG. 9 illustrates a further modification whereby an additional coil compression spring 65 is provided external to the light spring 15, and oppositely wound to avoid coil binding.

During assembly, the additional spring 65 bears on the proximal side of the material in which the hole is formed to ensure sufficient anti-rotational friction force between the distal side and the segmented ring 14. This feature may avoid the need to give a slight outward pull on the fastener during initial fastening, and can be useful where access is restricted. The additional spring 65 may be used in conjunction with the washer 61, or not, but is in any event provided with a corresponding recess in the shouldered washer 16 to obviate coil binding where the fastener is fully tightened.

Figure 10:
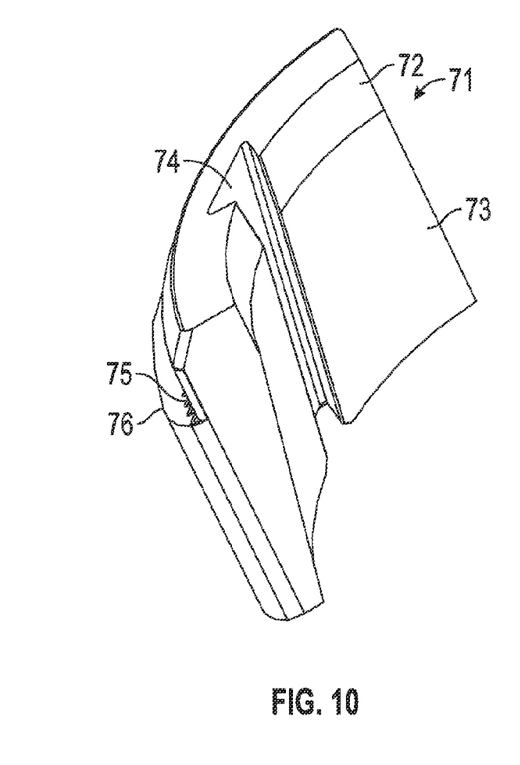
FIGS. 10 to 12 show alternative gripping teeth for segments of the segmented ring.

A somewhat schematic representation of a preferred segment 71 is illustrated in FIG. 10 and comprises a plain diameter portion 72, a tapered portion 73 and a dovetail recess 74 which corresponds to a suitable form of the collar 13. Gripping teeth 75 of suitable form are provided at the shoulders 76 so as to engage the distal side of the hole in use, and contribute to anti-rotation during initial assembly.

Figure 11:
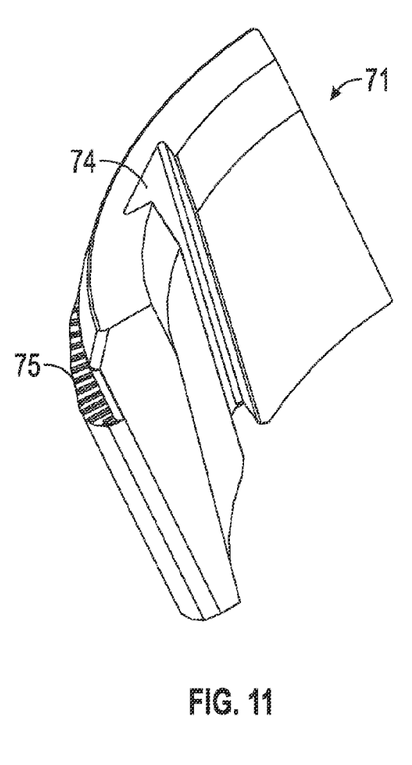
Figure 12:
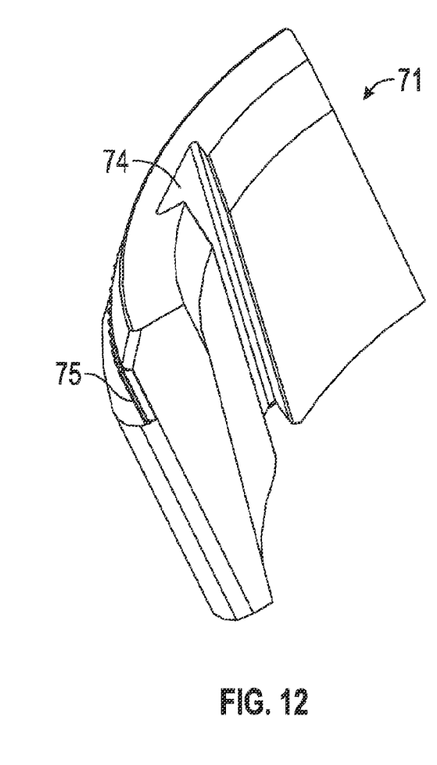

The gripping teeth 75 may extend radially to a partial extent (FIG. 10), radially to a full extent (FIG. 11), axially to a partial or full extent (FIG. 12), or in both radial and axial directions as required by the circumstances of the installation.

Figure 13:
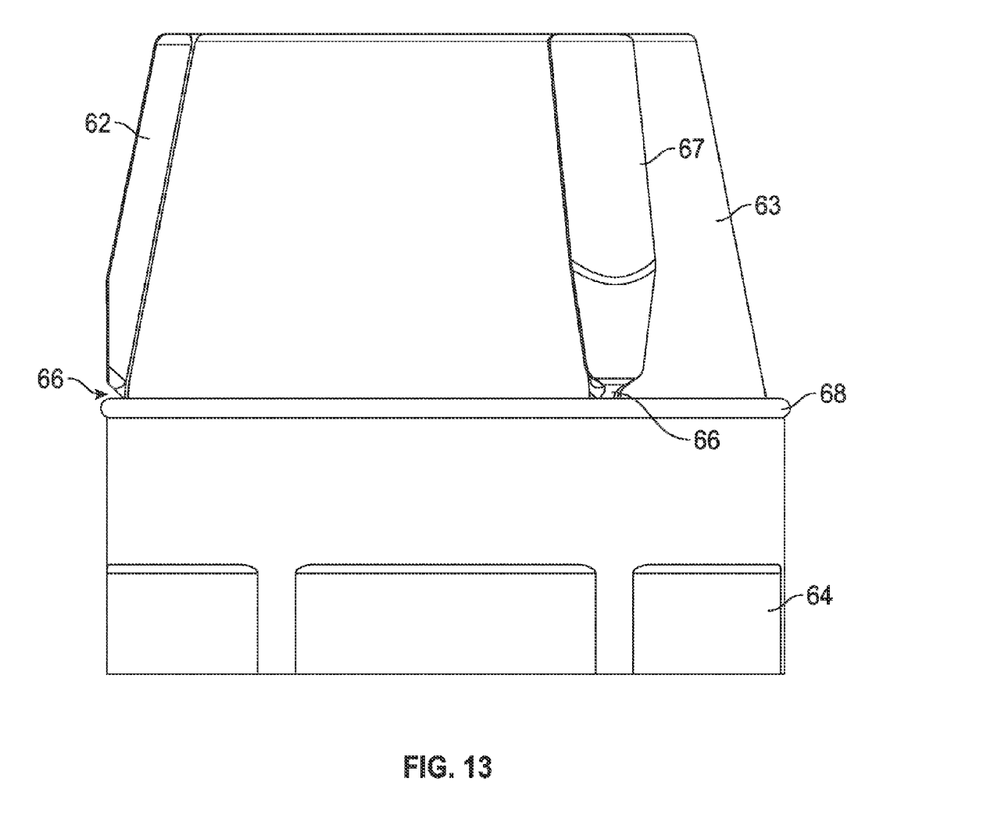
FIG. 13 illustrates in elevation an elastomeric fitting ring of the threaded cone.

A further enhancement is illustrated in FIG. 13, in which a composite collar and nut 63 has three equi-spaced male dovetail projections 67 at the base of which are respective groove 66. Retained by the grooves is a soft elastomeric ring 68, for example a synthetic rubber O-ring. The axial position of the grooves and the diameter of the O-ring is selected so that in the uninstalled condition, the distal side of the segmented ring 14 is prevented from bottoming on the collar, so that the outside diameter of the segmented ring is just less than the diameter of the hole. In this condition, the fastener will pass freely through to the blind side.

However, upon tightening, the ring 68 collapses or is displaced to permit the segments to come into functional engagement with the collar, either directly or through compression of the ring, and thus cause the radial movement necessary for engagement of the segmented ring 14 with the distal side of the hole. The ring 68 is essentially a single use fitting component intended to provide smooth passage of the fastener to the distal side of the hole.

It will be understood that the fitting ring 68 may also be used with a separate nut, the location feature of the ring being provided on the collar.

Figure 14A:
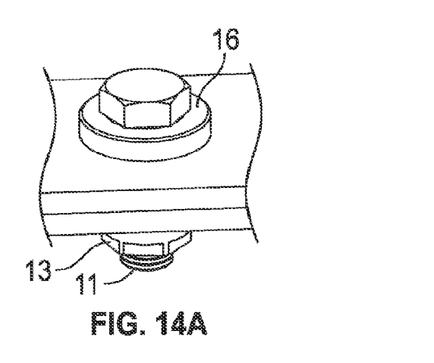
Figure 14B:
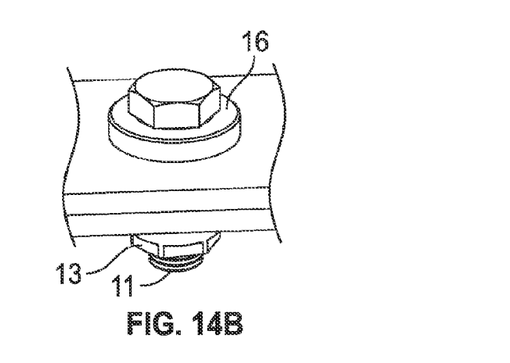
Figure 15A:
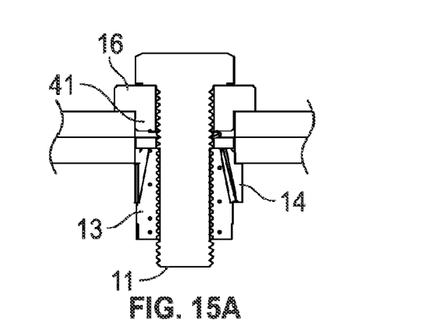
Figure 15B:
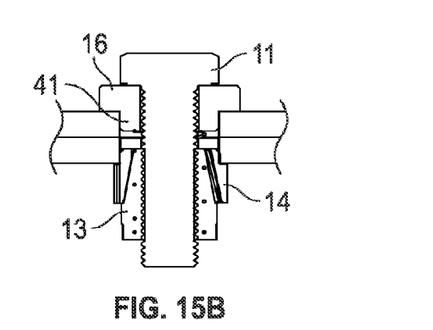

It will further be appreciated that the shouldered washer 16 may have different configurations depending upon the application of the blind fastener. FIGS. 14A-14F and 15A-15F illustrate a plurality of different possible shouldered washer configurations. The examples shown are not intended to be limiting, but merely illustrate a selection of possible configurations. In the examples shown in FIGS. 14A-14F and 15A-15F the nut 12 of the screw 11 is not shown.

Examples A and B of FIGS. 14A, 14B, 15A and 15B show a shouldered washer 16 having a configuration substantially has hereinbefore described. The washer 16 includes a reduced diameter portion 41 adapted for close fitting to the sides of the hole through which fastener extends.

Figure 14C:
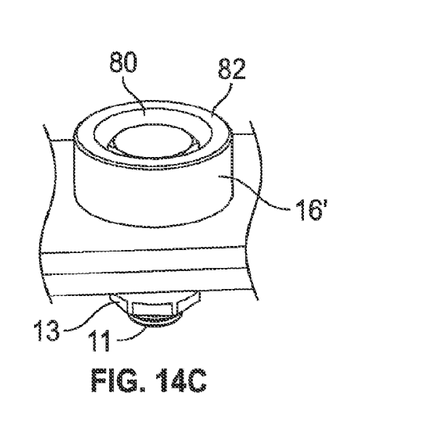
Figure 15C:
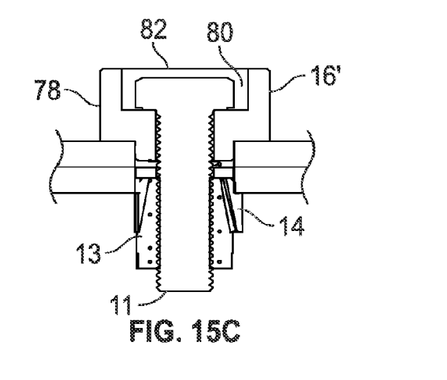

Example C of FIGS. 14C and 15C shows a shouldered washer 16' having a peripheral wall 78 which defines a recess 80. The hexagonal head of the machine screw 11 is received in the recess with sufficient clearance that an appropriately sized socket or box spanner can fit over the head. The height of the wall 78 is such that uppermost edge 82 of the shouldered washer 16' extends above the head of the machine screw 11.

Figure 14D:
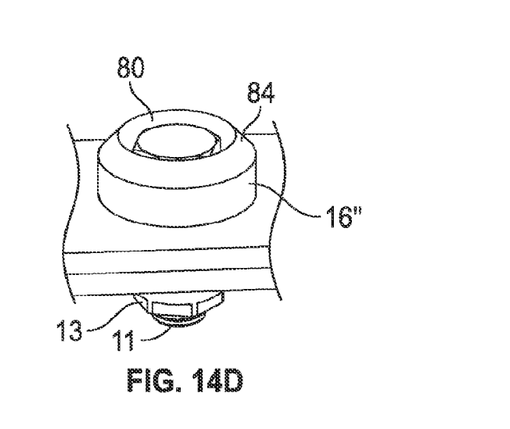
Figure 15D:
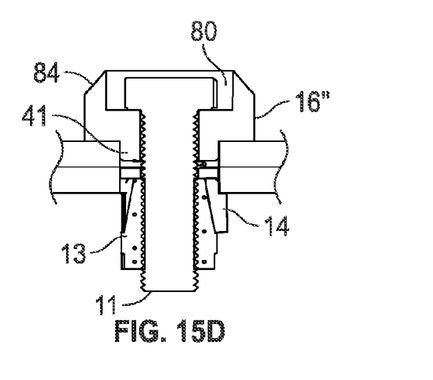

Example D of FIGS. 14D and 15D shows a shouldered washer 16" which is similar to that of example C. The washer 16" differs in that the peripheral wall 78 is tapered 84 such that the washer 16" has a semi-domed appearance.

Figure 14E:
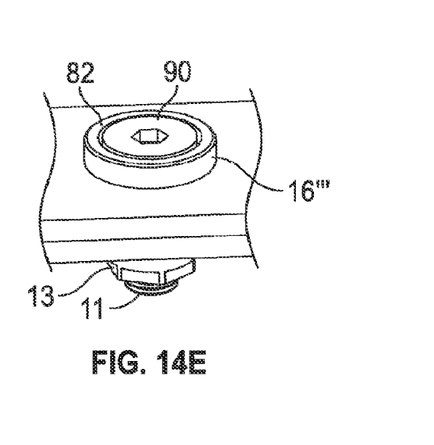
Figure 15E:
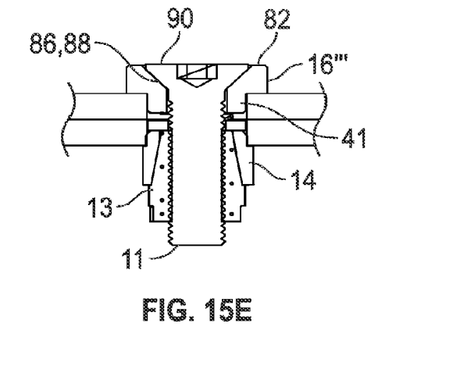

Example E of FIGS. 14E and 15E shows a shouldered washer 16''' which is adapted for use with a countersunk screw 11. The washer 16''' is provided with a through aperture 86 having a tapered portion 88 which accommodates the corresponding taper of the screw 11 such that the uppermost face 90 of the screw 11 is aligned substantially at the same level as the uppermost edge 82 of the washer 16'''.

Figure 14F:
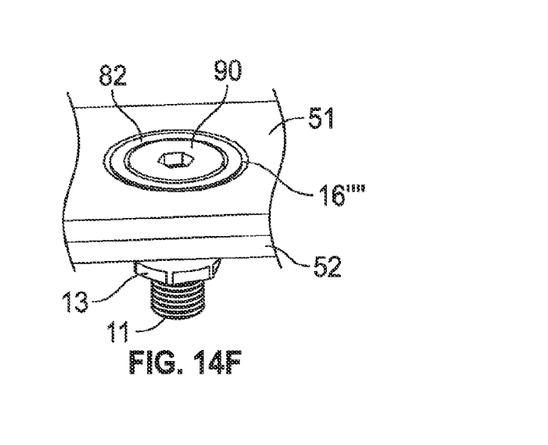
Figure 15F:
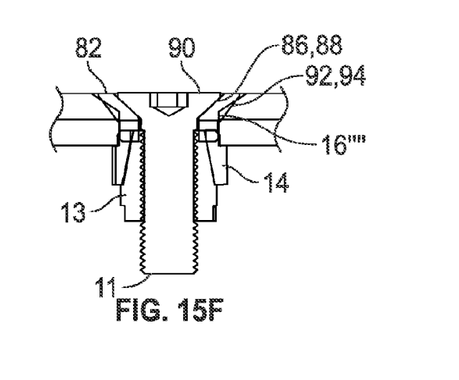

Example F of FIGS. 14F and 15F shows a further example of a shouldered washer 16"" adapted for use with a countersunk screw 11. In this example the shouldered washer 16"" is configured such that it is received in a countersunk hole 92, with the result that both the washer 16"" and head of the countersunk screw 11 are substantially flush with the upper plate 51. The washer 16"" is provided with tapered outer surface 94 which is dimensioned so as to be received within the countersunk hole 92.

Figure 16:
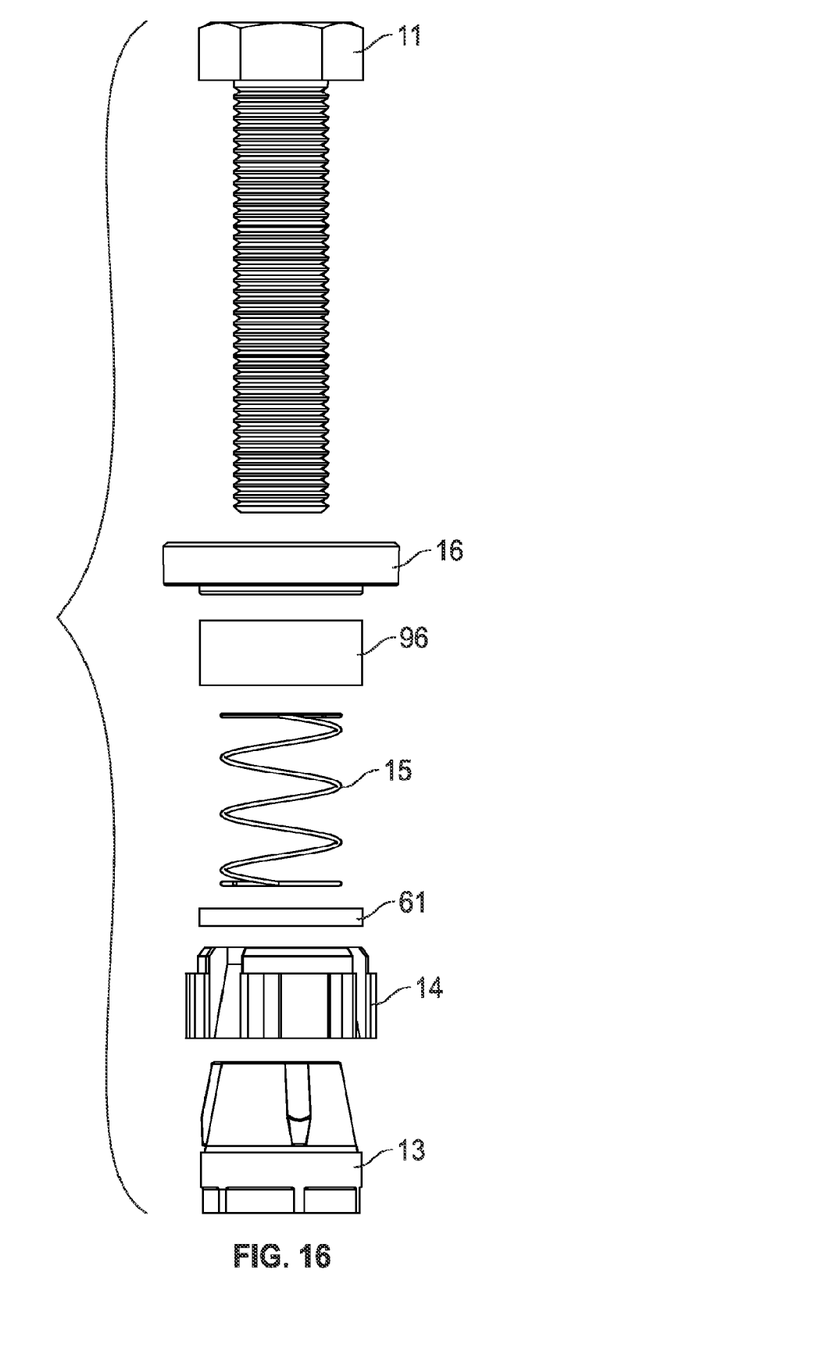
FIG. 16 shows a exploded side view of a fastener adapter according to an embodiment of the disclosure and a machine screw.
Figure 17:
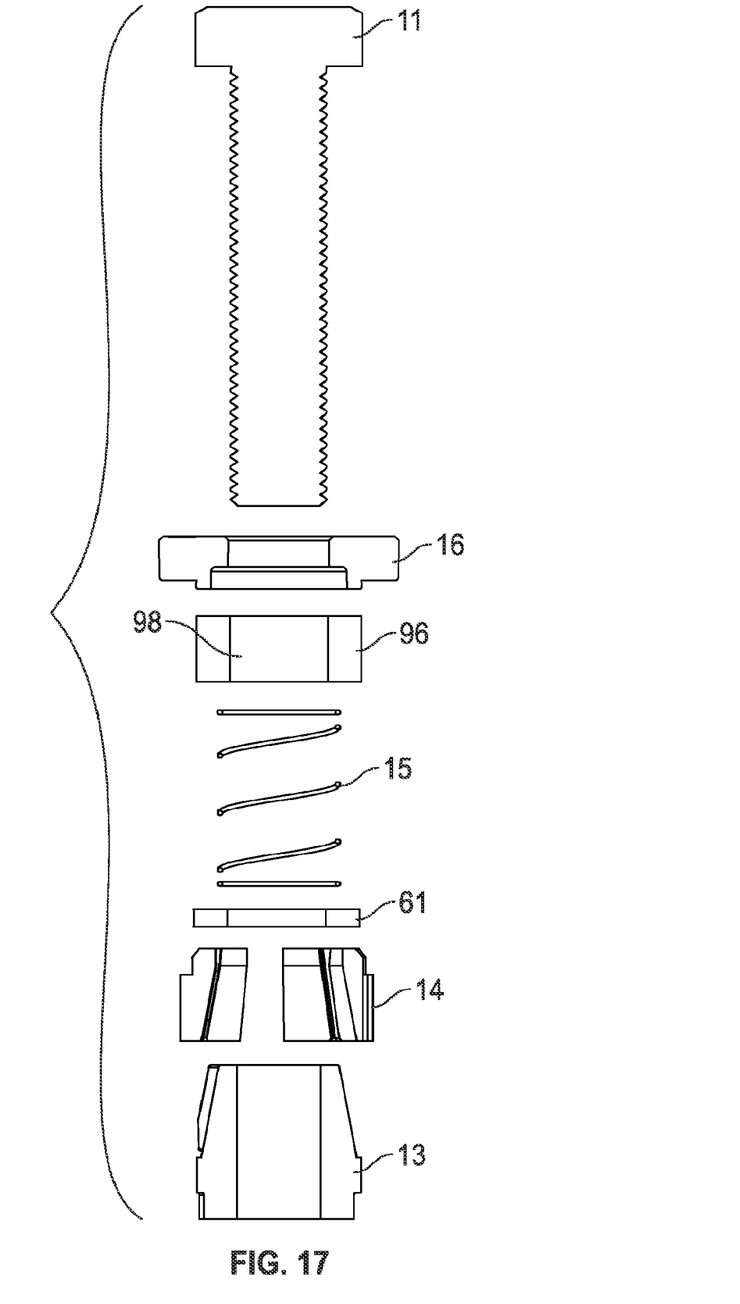
FIG. 17 shows a cross-sectional view of the fastener adapter and machine screw of FIG. 16.

FIGS. 16 and 17 show an alternative embodiment of a fastener adapter and machine screw in accordance with the disclosure. Features common to the previously described embodiments are identified with like reference numerals. The hexagon nut 12 is not shown.

The fastener adapter includes a shear bush 96 which is positioned intermediate the shouldered washer 16 and the spring 15. The shear bush 96 is substantially tubular and includes a through bore 98. The through bore 98 may be plain such that the bush 96 is a sliding fit over the thread of the screw 11. Alternatively, the through bore 98 may be provided with a thread such that the bush 96 may be threaded on to the thread of the screw. In use, the bush 96 is positioned in the hole extending through the two plates 51, 52 so as to increase the shear resistance of the blind fastener in the shear plane between the plates 51, 52 being fastened. It will be appreciated that the length of the bush 96 is dependent upon the thickness of the plates 51, 52.

Several modifications and alternatives have been described, and may be used independently or in combination to provide the required technical characteristics for a particular installation. In view of the foregoing description, it is evident that numerous other alternatives, modifications and variations will be apparent to those skilled in the art. Accordingly, the disclosure is intended to encompass all such alternatives, modifications and variations which fall within the scope and spirit of the disclosure and the following claims.

We claim:

1. A blind fastener adapter configured for use with a threaded fastener, the adapter comprising a collar and a ring of separate segments over the collar, the ring and collar having a tapered interface wherein relative axial movement results in a change of diameter of said ring, said adapter further including an axially acting spring adapted to bias said collar and ring into mutual engagement, said collar and ring being configured to prevent angular movement with respect to each other, said collar being threaded for engagement by a blind side of the threaded fastener in use, and said ring being adapted for blind side engagement of a perimeter of a hole, wherein the spring is a coil compression spring bearing directly on said ring in use, and the spring is sized to fit closely around the threaded fastener and a shouldered washer located at a proximal side of said coil compression spring, wherein a diameter of said shouldered washer is sized to engage closely within the hole.

2. A blind fastener adapter as claimed in claim 1 wherein the threaded fastener is anyone of a screw, a threaded stud, or a shank of a male fastener.

3. A blind fastener adapter as claimed in claim 1 wherein the said ring and collar are fixed against relative rotation with respect to each other by protrusions on one of the said ring and collar, and mating recesses of the other of said ring and collar.

4. A blind fastener adapter as claimed in claim 1 wherein the ring and the collar are fixed a against relative rotation with respect to each other by protruding rails of the collar which extend in the direction of the axis of rotation thereof, and engage in close fitting grooves of the ring.

5. A blind fastener adapter as claimed in claim 3 wherein the ring has three segments.

6. A blind fastener adapter as claimed in claim 5 wherein each segment is retained against radial separation from the collar.

7. A blind fastener adapter as claimed in claim 6 wherein each segment is retained against radial separation by the protrusions that engage the recesses wherein the protrusion are rails with an enlarged head and the recesses are undercut grooves, wherein the protrusion prevents radial separation of each segment from the collar when the rails are located in the grooves.

8. A blind fastener adapter as claimed in claim 1, further comprising a second coil compression spring outboard the coil compression spring, wherein the second coil compression spring has a diameter greater than a diameter of the hole.

9. A blind fastener adapter as claimed in claim 1 wherein said shouldered washer has an internal recess of sufficient depth to accept said coil compression spring therein when the coil compression spring is compressed.

10. A blind fastener adapter as claimed in claim 1 and further including a tubular bush positioned between the shouldered washer and the proximal side of said coil compression spring.

11. A blind fastener adapter as claimed in claim 1 wherein the ring has a reduced diameter portion at a proximal side so as to present a shoulder, the reduced diameter portion also being sized for close fitting engagement in the hole for which the blind fastener adapter is intended, and the shoulder bearing on the perimeter of the distal side of the hole in use.

12. A blind fastener adapter as claimed in claim 1 wherein a washer is provided proximally to the segmented ring so as to distribute spring loads applied thereto.

13. A blind fastener adapter as claimed in claim 12 wherein the washer is a close diameter fit in the hole for which the blind fastener adapter is intended.

14. A blind fastener adapter as claimed in claim 12 wherein the washer is of a thickness to substantially bridge the clearance between the segmented ring and shouldered washer in use.

* * * * *